(12) United States Patent
Kawamura et al.

(10) Patent No.: US 9,908,509 B2
(45) Date of Patent: Mar. 6, 2018

(54) PORTABLE DEVICE

(71) Applicant: KABUSHIKI KAISHA TOKAI RIKA DENKI SEISAKUSHO, Aichi (JP)

(72) Inventors: Tetsuya Kawamura, Aichi (JP); Masayuki Kawamura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/324,833

(22) PCT Filed: Sep. 3, 2015

(86) PCT No.: PCT/JP2015/075116
§ 371 (c)(1),
(2) Date: Jan. 9, 2017

(87) PCT Pub. No.: WO2016/039255
PCT Pub. Date: Mar. 17, 2016

(65) Prior Publication Data
US 2017/0197586 A1     Jul. 13, 2017

(30) Foreign Application Priority Data
Sep. 12, 2014 (JP) ................................. 2014-186327

(51) Int. Cl.
*H04W 52/02*   (2009.01)
*B60R 25/24*   (2013.01)
(Continued)

(52) U.S. Cl.
CPC .............. *B60R 25/24* (2013.01); *B60R 25/40* (2013.01); *B60R 25/406* (2013.01); *E05B 19/00* (2013.01);
(Continued)

(58) Field of Classification Search
CPC ..... H04L 12/12; H04M 19/04; H04M 1/7253; H04M 1/72569; H04M 1/72597;
(Continued)

(56) References Cited

U.S. PATENT DOCUMENTS 8,430,310 B1 * 4/2013 Ho ........................... G06F 21/35
235/382
2004/0183714 A1   9/2004 Yamashita et al.
(Continued)

FOREIGN PATENT DOCUMENTS

JP     10-231651      9/1998
JP     2002-320278    10/2002
(Continued)

OTHER PUBLICATIONS

Search Report issued in International Patent Application No. PCT/JP2015/075116, dated Nov. 24, 2015.
(Continued)

*Primary Examiner* — Dionne H Pendleton
(74) *Attorney, Agent, or Firm* — Greenblum & Bernstein, P.L.C.

(57) ABSTRACT

A portable device having a built-in electronic component has normal mode, in which the electronic component functions, and power saving mode, in which power less than that consumed in the normal mode is consumed. The portable device is provided with: a use state detection unit that detects the in-use state or the non in-use state of the portable device; and a mode control unit that shifts the mode of the portable device to the power saving mode, in the cases where a fixed time has elapsed after the use state detection unit detected that the state of the portable device is shifted to the non in-use state.

4 Claims, 2 Drawing Sheets

(51) Int. Cl.
  *E05B 19/00* (2006.01)
  *E05B 49/00* (2006.01)
  *H04B 1/3883* (2015.01)
  *H04B 1/401* (2015.01)
  *B60R 25/40* (2013.01)
  *E05B 81/54* (2014.01)

(52) U.S. Cl.
  CPC .............. *E05B 49/00* (2013.01); *E05B 81/54* (2013.01); *H04B 1/3883* (2013.01); *H04B 1/401* (2013.01); *H04W 52/0254* (2013.01); *H04W 52/0258* (2013.01); *H04W 52/0274* (2013.01)

(58) Field of Classification Search
  CPC .............. H04M 1/72563; H04W 88/02; H04W 52/0254; H04W 52/0258; H04W 52/0251; H04W 52/0261; H04W 52/0274; Y02B 60/34; Y02B 60/50
  See application file for complete search history.

(56) References Cited

U.S. PATENT DOCUMENTS

| | | | |
|---|---|---|---|
| 2010/0164736 A1* | 7/2010 | Byers | H04L 12/12 340/657 |
| 2012/0315960 A1* | 12/2012 | Kim | H04W 52/0254 455/574 |
| 2015/0061862 A1* | 3/2015 | Lee | H04M 1/7253 340/539.11 |

FOREIGN PATENT DOCUMENTS

| | | |
|---|---|---|
| JP | 2004-263447 | 9/2004 |
| JP | 2007-170162 | 7/2007 |

OTHER PUBLICATIONS

Translation of International Preliminary Report on Patentability in PCT/JP2015/075116, dated Mar. 14, 2017.

\* cited by examiner

PORTABLE DEVICE

TECHNICAL FIELD

The present invention relates to a portable device incorporating an electronic component.

BACKGROUND ART

A known electronic key system allows a vehicle door to be unlocked when a user carrying a portable device (electronic key) approaches a vehicle door and allows an engine to start when the user enters the passenger compartment (refer to, for example, patent document 1). In the electronic key system, a communication area is formed around the vehicle door and in the passenger compartment. When the user who carries the portable device enters the communication area, wireless communication is performed between the portable device and an in-vehicle device installed in the vehicle. The wireless communication unlocks the vehicle door and allows the engine to start.

Except when the vehicle is driven, the portable device of the electronic key system is often left unused, for example, on a desk in a house. In such a portable device, the constant supply of power to the incorporated electronic component even when the portable device is not used consumes the power of the battery. Thus, power drainage of the battery is apt to occur.

A power saving mode may be set to reduce current in a standby state, and a particular switch operation may be performed to allow the portable device to shift to the power saving mode.

PRIOR ART DOCUMENT

Patent Document

Patent Document 1: Japanese Laid-Open Patent Publication No. 2007-170162 (paragraph [0025])

SUMMARY OF THE INVENTION

Problems that are to be Solved by the Invention

The switch operation performed by a user to switch a mode of the portable device is complicated. In addition, the effect of power saving is not obtained when the operation is not performed.

It is an object of the present invention to provide a portable device that is capable of automatically shifting to a power saving mode.

Means for Solving the Problem

One aspect of the present invention is a portable device incorporating an electronic component. The portable device is operated in a normal mode in which the electronic component functions and a power saving mode that consumes less power than the normal mode. The portable device includes a use state detector that detects one of a use state and a non-use state of the portable device and a mode controller that shifts the portable device to the power saving mode when a constant time elapses from when the use state detector detects that the portable device has shifted to the non-use state.

Effect of the Invention

The present invention is capable of automatically shifting to a power saving mode.

EMBODIMENTS OF THE INVENTION

A first embodiment of a portable device 2 will now be described.

Figure 1:
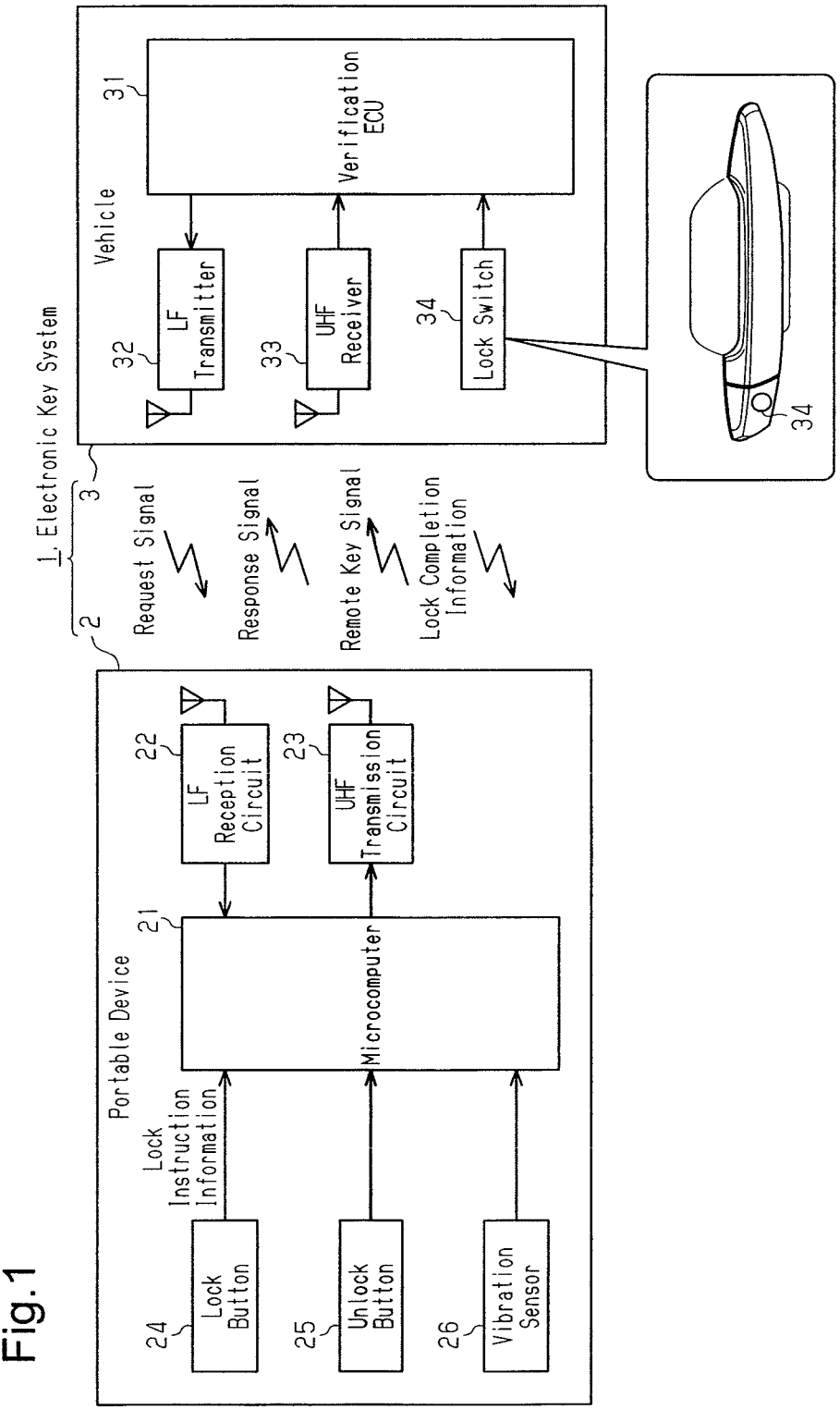
FIG. 1 is a block diagram showing the configuration of an electronic key system.

As shown in FIG. 1, the portable device 2 is an element of an electronic key system 1. The portable device 2 is capable of performing bidirectional communication with a vehicle 3 and unidirectional communication, in which the portable device 2 transmits signals. An LF (low frequency) band radio wave and a UHF (ultrahigh frequency) band radio wave are used for bidirectional communication, and a UHF band radio wave is used for unidirectional communication.

The portable device 2 includes a microcomputer 21 that centrally controls the portable device 2, an LF reception circuit 22 that is capable of receiving an LF radio wave, and a UHF transmission circuit 23 that is capable of transmitting a UHF radio wave. The microcomputer 21 includes a memory that stores an ID (identification) unique to the portable device 2. When the LF reception circuit 22 receives an LF radio wave, the microcomputer 21 determines whether or not the LF radio wave is a request signal from the vehicle 3. When the microcomputer 21 determines that the LF radio wave is a request signal from the vehicle 3, the microcomputer 21 transmits a response signal including the ID from the UHF transmission circuit 23. The response signal is analyzed by the vehicle 3. When the ID included in the response signal matches a reference ID that has been registered to the vehicle 3, for example, a vehicle door is locked. When locking of the vehicle door is completed, the vehicle 3 transmits an LF radio wave that includes lock completion information indicating that the locking has been completed. This allows the microcomputer 21 to acquire the lock completion information. The LF reception circuit 22 includes an LF antenna, which is a medium that acquires the lock completion information. The microcomputer 21 and the LF reception circuit 22 form a lock completion information acquisition unit. The lock completion information corresponds to lock affirmation information that affirms locking of the vehicle door. The microcomputer 21 corresponds to a lock affirmation information acquisition unit.

The portable device 2 includes a lock button 24 that is operated to instruct locking of the vehicle door and an unlock button 25 that is operated to instruct unlocking of the vehicle door. When the lock button 24 is operated, the microcomputer 21 transmits, from the UHF transmission circuit 23, a remote key signal including the ID and an operation code that instructs locking of the vehicle door. Similarly, when the unlock button 25 is operated, the microcomputer 21 transmits, from the UHF transmission circuit 23, a remote key signal including the ID and an operation code that instructs unlocking of the vehicle door. When the lock button 24 is operated, the lock button 24 provides lock instruction information indicating that a remote operation has been performed to instruct locking of the vehicle door.

This allows the microcomputer 21 to acquire the lock instruction information. The lock instruction information corresponds to the lock affirmation information that affirms locking of the vehicle door. The microcomputer 21 corresponds to a lock instruction information acquisition unit.

The portable device 2 includes a vibration sensor 26 that detects vibration of the portable device 2. When the microcomputer 21 receives a detection signal indicating that the portable device 2 is vibrating, the microcomputer 21 detects that the portable device 2 is being carried. When the microcomputer 21 detects that the portable device 2 is being carried, the microcomputer 21 sets the portable device 2 to a normal mode in which an electronic component such as the LF reception circuit 22 functions so that a request signal from the vehicle 3 can be received. For example, when a user who is carrying the portable 2 is walking, the portable device 2 is set to the normal mode.

When the microcomputer 21 receives a detection signal indicating that the portable device 2 is not vibrating, the microcomputer 21 detects that the portable device 2 has shifted to a non-carrying state. When the microcomputer 21 has acquired the lock affirmation information and detects that the portable device 2 has shifted to the non-carrying state, the microcomputer 21 detects that the portable device 2 has shifted to a first non-use state. When a first constant time (for example, ten minutes) elapses from when the portable device 2 shifts to the first non-use state, the microcomputer 21 shifts the portable device 2 to a power saving mode that consumes less power than the normal mode. In the power saving mode, the supply of power to the LF reception circuit 22 is interrupted, and the function for receiving an LF radio wave is inactivated. Thus, the determination of whether or not the LF radio wave received by the LF reception circuit 22 is a request signal from the vehicle 3, which is performed by the microcomputer 21 in the normal mode, is not performed in the power saving mode. An example of a first non-use state is a situation in which the user locks the vehicle door, enters a house, and places the portable device 2 on a desk. The first constant time can be set to any time.

The microcomputer 21 detects that the portable device 2 has shifted to a second non-use state when detecting that the portable device 2 has shifted to the non-carrying state without acquiring the lock affirmation information. When a second constant time (for example, twenty minutes) elapses from when the portable device 2 shifts to the second non-use state, the microcomputer 21 shifts the portable device 2 to the power saving mode. An example of a second non-use state is a situation in which the user remains in the passenger compartment without locking the vehicle door. The second constant time can be set to any time. The vibration sensor 26 is a medium that detects the carrying state of the portable device 2. The vibration sensor 26 and the microcomputer 21 form a carrying state detector. Further, the microcomputer 21 forms a use state detector that detects the use state of the portable device 2. The microcomputer 21 corresponds to a mode controller.

The vehicle 3 includes a verification electronic control unit (ECU) 31 that mainly controls security, an LF transmitter 32 that is capable of transmitting an LF signal such as a request signal to the surrounding of the vehicle door, a UHF receiver 33 that is capable of receiving a UHF radio wave, and a lock switch 34 that is operated to lock the vehicle door. The verification ECU 31 includes a memory that registers an ID of the portable device 2 corresponding to the vehicle 3 as a reference ID. A plurality of reference IDs are registered, each corresponding to the same vehicle 3 of a plurality of portable devices 2.

The verification ECU 31 transmits a request signal from the LF transmitter 32 when the lock switch is operated. When the UHF receiver 33 receives a response signal in response to the request signal, the verification ECU 31 verifies an ID that is included in the response signal with the reference IDs. When the ID matches any one of the reference IDs, the verification ECU 31 locks the vehicle door. When the locking of the vehicle door is completed, the verification ECU 31 transmits, from the LF transmitter 32, an LF radio wave including the lock completion information indicating that the locking has been completed. This allows the portable device 2 to acquire the lock completion information.

The operation of the portable device 2 will now be described.

Figure 2:
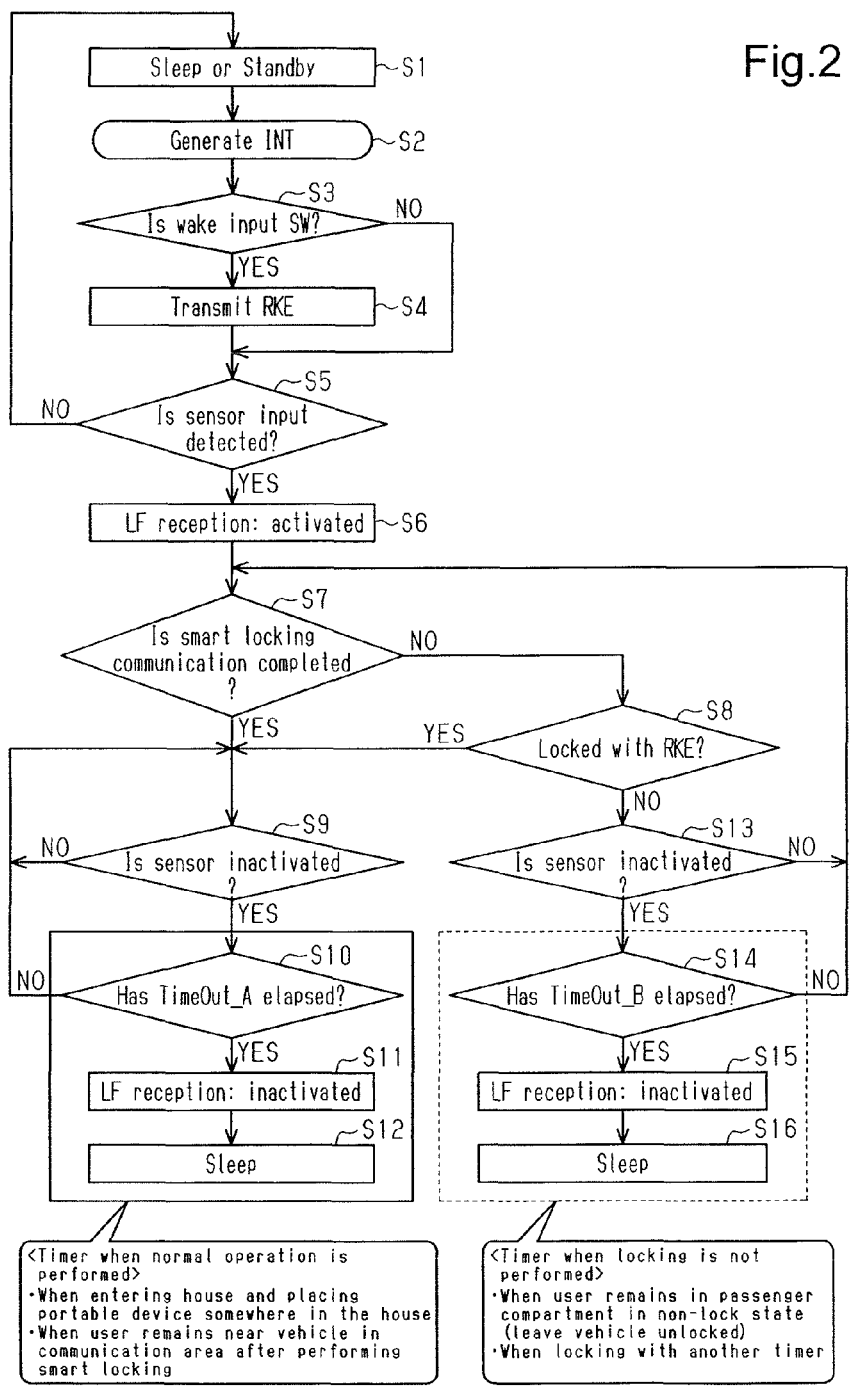
FIG. 2 is a flowchart showing the operation when switching modes of a portable device.

As shown in FIG. 2, when the portable device 2 is in the power saving mode (sleep state in which function for receiving LF radio wave is inactivated) or in the normal mode (standby state that waits for receipt of request signal), operation of the lock button 24 as a trigger input to the portable device 2 (step S3: YES) transmits a remote key signal from the portable device 2 to instruct locking of the vehicle door. When the vibration sensor 26 detects vibration of the portable device 2 (step S5: YES), the microcomputer 21 activates the function for receiving an LF radio wave (step S6) and shifts the portable device 2 to the normal mode. In this case, the microcomputer 21 acquires the lock instruction information from the lock button 24 and affirms locking of the vehicle door (step S8: YES). When the vehicle door is locked after the remote key signal is analyzed by the vehicle 3, the microcomputer 21 may acquire the lock completion information from the vehicle 3 and affirm locking of the vehicle door (another case that results in step S8: YES).

When locking of the vehicle door is affirmed, the microcomputer 21 starts measuring time with a timer. Whenever the vibration sensor 26 detects vibration of the portable device 2 (step S9: NO), the microcomputer 21 resets the time that has been measured. When the time measured in the measurement operation reaches the first constant time (step S10: YES), the microcomputer 21 inactivates the function for receiving an LF radio wave (step S11) and shifts the portable device 2 to the power saving mode. Thus, if the user locks the vehicle door with the lock button 24, enters the house, and places the portable device 2 somewhere in the house, the portable device 2 shifts to the power saving mode as the first constant time elapses from when the portable device 2 is placed somewhere in the house, that is, from when the portable device 2 shifts to the non-use state.

When the portable device 2 is being carried and the lock button 24 is not operated (step S3: NO), if the vibration sensor 26 detects vibration of the portable device 2 (step S5: YES), the microcomputer 21 activates the function for receiving an LF radio wave (step S6) and shifts the portable device 2 to the normal mode. In this case, when the lock switch 34 of the vehicle 3 is operated, the vehicle 3 transmits a request signal. Further, when the portable device 2 that is in the normal mode receives the request signal; the portable device 2 transmits a response signal. When the vehicle door is locked after the response signal is analyzed in the vehicle 3, the microcomputer 21 acquires the lock completion information from the vehicle 3 and affirms locking of the vehicle door (step S7: YES).

When locking of the vehicle door is affirmed, the microcomputer 21 starts measuring time with a timer. Whenever the vibration sensor 26 detects vibration of the portable device 2 (step S9: NO), the microcomputer 21 resets the time that has been measured. When the time measured in the measurement operation reaches the first constant time (step S10: YES), the microcomputer 21 inactivates the function for receiving an LF radio wave (step S11) and shifts the portable device 2 to the power saving mode. After smart locking that is started by the operation of the lock switch 34, the user who is carrying the portable device 2 may remain near the vehicle in the communication area. In this case, the portable device 2 shifts to the power saving mode if the first constant time elapses from when the portable device 2 started to be still in a pocket or a bag with the user located near the vehicle, that is, from when the portable device 2 shifted to the non-use state.

When the microcomputer 21 does not affirm locking of the vehicle door (steps S7 and S8: NO) and when the vibration sensor 26 does not detect vibration of the portable device 2 (step S13: YES), the microcomputer 21 starts measuring time with another timer. Whenever the vibration sensor 26 detects vibration of the portable device 2 (step S13: NO), the microcomputer 21 resets the time that has been measured. When the measured time in the measurement operation reaches a second constant time (step S14: YES), the microcomputer 21 inactivates the function for receiving an LF radio wave (step S15) and shifts the portable device 2 to the power saving mode. The user may remain in the passenger compartment in a non-lock state in which the vehicle door is not locked (leave the vehicle 3 unlocked). In this case, the portable device 2 shifts to the power saving mode if the second constant time elapses from when the portable device 2 started to be still in the passenger compartment with the user located in the passenger compartment, that is, from when the portable device 2 shifted to the non-use state. Further, when the vehicle door is locked by another portable device carried by the vehicle passenger, the portable device 2 carried by the user shifts to the power saving mode in step S16.

As described above, the portable device 2 of the present embodiment has the following advantages.

(1) When a constant time elapses from when the portable device 2 shifts to a non-use state, the portable device 2 shifts to the power saving mode. In this process, for example, the user does not perform a switch operation. This allows the portable device 2 to automatically shift to the power saving mode.

(2) When the microcomputer 21 detects that the portable device 2 has shifted to the non-carrying state, the microcomputer 21 detects that the portable device 2 has shifted to the non-use state. In this configuration, the portable device 2 automatically shifts to the power saving mode if a constant time elapses from when the portable device 2 is no longer carried. This limits power consumption in the non-carrying state.

(3) When the microcomputer 21 acquires the lock affirmation information, the microcomputer 21 detects that the portable device 2 has shifted to the non-use state. In this configuration, the portable device 2 automatically shifts to the power saving mode after a constant time elapses from when locking of the vehicle door is affirmed. After locking of the vehicle door is affirmed, the portable device 2 is usually not used. In such a non-use state, power consumption is limited.

(4) When the microcomputer 21 acquires the lock completion information, the microcomputer 21 detects that the portable device 2 has shifted to the non-use state. In this configuration, the portable device 2 automatically shifts to the power saving mode when a constant time elapses from when the vehicle door is locked. After the vehicle door is locked, the portable device 2 is usually not used. In such a non-use state, power consumption is limited.

(5) When the microcomputer 21 acquires the lock instruction information, the microcomputer 21 detects that the portable device 2 has shifted to the non-use state. In this configuration, the portable device 2 automatically shifts to the power saving mode when a constant time elapses from when a remote operation is performed to instruct locking of the vehicle door. After the remote operation is performed, the portable device 2 is usually not used. In such a non-use state, power consumption is limited.

(6) The first constant time in which the portable device 2 is in the non-use state is set to differ from the second constant time in which the portable device 2 is in the non-use state. This allows for power saving control that takes into account the movement of a user with or without locking of the vehicle door.

(7) A situation in which the user locks the vehicle door, enters the house, and places the portable device 2 on a desk is referred to as the first non-use state. A situation in which the user remains in the passenger compartment without locking the vehicle door is referred to as the second non-use state. In the second non-use state, the portable device 2 is more likely to be used at a relatively early stage to lock the unlocked vehicle door. In the first non-use state, the portable device 2 is not likely to be immediately used because the vehicle door has already been locked. Thus, in the first non-use state, the present example increases the effect of power saving when the portable device 2 shifts to the power saving mode after a short time elapses from when the portable device 2 shifts to the first non-use state.

(8) The first constant time and the second constant time can each be set to any time. Thus, the time in which the effect of power saving is obtained can be set to any time.

(9) Power consumption of a battery is limited when the user does not use the portable device 2 regardless of whether or not the user is in the passenger compartment.

(10) The battery life is improved compared to the prior art and extended by approximately two times.

The above embodiment may be modified as follows.

The first constant time is not limited to ten minutes. For example, when the first constant time is set to zero minutes, the portable device 2 immediately shifts to the power saving mode when shifted to the non-use state.

The second constant time is not limited to twenty minutes. For example, when the first constant time is set to zero minutes, the portable device 2 immediately shifts to the power saving mode when shifted to the non-use state.

The portable device 2 may automatically shift to the power saving mode under the condition that the same constant time has elapsed from when the portable device 2 shifted to the first non-use state and the portable device 2 shifted to the second non-use state.

The first constant time may be longer than the second constant time.

The portable device 2 may include a setting button that customizes the first constant time and the second constant time. This allows the user to customize the first constant time and the second constant time.

The first non-use state may include a first non-use state when smart locking is performed and a first non-use state when remote locking is performed. In this case, the constant time of the first non-use state when smart locking is performed is the same as or different from that when remote locking is performed.

In the above embodiment, the first constant time and the second constant time are each set to any time. Instead, the first constant time and the second constant time may each be set to a fixed value.

In addition to inactivating the function for receiving an LF radio wave, the power saving mode may also interrupt the supply of power to all of the electronic components incorporated in the portable device 2.

The power saving mode of step S12 may be distinguished from the power saving mode of step S16 so that the power saving modes of step S12 and S16 have different power consumptions.

When the microcomputer 21 detects that the portable device 2 is not vibrating after a constant time elapses from when locking of the vehicle door is affirmed, the microcomputer 21 may shift the portable device 2 to the power saving mode.

If the microcomputer 21 detects that the portable device 2 is not vibrating when a constant time elapses from when detecting that the portable device 2 is not vibrating without affirming locking of the vehicle door, the microcomputer 21 may shift the portable device 2 to the power saving mode.

Whenever the same or different predetermined time elapses from when locking of the vehicle door is affirmed, the microcomputer 21 detects whether or not the portable device 2 is vibrating. When detecting that the portable device 2 is not vibrating, the microcomputer 21 may shift the portable device 2 to a power saving mode in which less power is consumed.

Whenever the same or different predetermined time elapses from when detecting that the portable device 2 is not vibrating without affirming locking of the vehicle door, the microcomputer 21 detects whether or not the portable device 2 is vibrating. When detecting that the portable device 2 is not vibrating, the microcomputer 21 may shift the portable device 2 to the power saving mode that consumes less power.

Regardless of whether or not the lock affirmation information is acquired, when detecting that the portable device 2 shifted to the non-carrying state, the microcomputer 21 may detect that the portable device 2 shifted to the non-use state.

Regardless of the carrying state of the portable device 2, when acquiring the lock affirmation information, the microcomputer 21 may detect that the portable device 2 shifted to the non-use state.

The portable device 2 may include a temperature sensor as an external factor detection device instead of or in addition to the vibration sensor 26. The external factor detection device forms the carrying state detector.

The present invention may be applied to a portable device that is capable of performing bidirectional communication with the vehicle 3 but does not have a function of unidirectional communication.

The present invention may be applied to a portable device that is capable of performing unidirectional communication with the vehicle 3 but does not have a function of bidirectional communication.

The present invention may be applied to a portable device used for an electronic key system of a building. Further, the present invention may be applied to a portable device used both for a vehicle key and a building key.

The invention claimed is:

1. A portable device incorporating an electronic component, wherein the portable device is operable in a normal mode in which the electronic component functions and a power saving mode that consumes less power than the normal mode, the portable device comprising:
   a use state detector that detects one of a use state and a non-use state of the portable device; and
   a mode controller that shifts the portable device to the power saving mode when a constant time elapses from when the use state detector detects that the portable device has shifted to the non-use state,
   wherein the use state detector includes:
   a lock affirmation information acquirer unit that acquires lock affirmation information affirming locking of a lock mechanism that is electrically lockable by the portable device; and
   a carrying state detector that detects a carrying state of the portable device, wherein
   the use state detector is configured to detect that the portable device has shifted to a first non-use state by affirming locking of the lock mechanism when the lock affirmation information acquirer acquires the lock affirmation information, and
   the use state detector is configured so that the use state detector does not affirm locking of the lock mechanism when the lock affirmation information acquirer does not acquire the lock affirmation information; and that when locking of the lock mechanism is not affirmed and the carrying state detector detects that the portable device has shifted to a non-carrying state, the use state detector detects that the portable device has shifted to a second non-use state, and
   the mode controller is configured to:
   shift the portable device to the power saving mode when a first constant time elapses from when the use state detector detects that the portable device has shifted to the first non-use state; and
   shift the portable device to the power saving mode when a second constant time elapses from when the use state detector detects that the portable device has shifted to the second non-use state.

2. The portable device according to claim 1, wherein the use state detector includes a carrying state detector that detects one of a carrying state and a non-carrying state of the portable device, and
   the use state detector is configured to detect that the portable device has shifted to the non-use state when the carrying state detector detects that the portable device has shifted to the non-carrying state.

3. The portable device according to claim 1, wherein the lock affirmation information acquirer includes a lock completion information acquirer that acquires lock completion information indicating that locking of the lock mechanism, which is lockable through bidirectional communication with the portable device, has been completed, and
   the use state detector is configured to detect that the portable device has shifted to the non-use state when the lock completion information acquirer acquires the lock completion information.

4. The portable device according to claim 1, wherein the lock affirmation information acquirer includes a lock instruction information acquirer that acquires lock instruction information indicating that a remote operation has been performed to instruct locking of the lock mechanism, which is lockable through a unidirectional communication in which the portable device transmits a signal, and
   the use state detector is configured to detect that the portable device has shifted to the non-use state when the lock instruction information acquisition unit acquires the lock instruction information.

\* \* \* \* \*